O. Osborn,
Plow.

No. 109,340. Patented Nov. 15, 1870.

Witnesses:

Inventor.
Ornan Osborn
per
Alexander Mason
Atty.

UNITED STATES PATENT OFFICE.

ORNAN OSBORN, OF ERIE, PENNSYLVANIA.

IMPROVEMENT IN PLOWS.

Specification forming part of Letters Patent No. 109,340, dated November 15, 1870.

*To all whom it may concern:*

Be it known that I, ORNAN OSBORN, of the city of Erie, in the county of Erie, and in the State of Pennsylvania, have invented certain new and useful Improvements in Plows; and I do hereby declare that the following is a full, clear, and exact description thereof, reference being had to the accompanying drawings, and to the letters of reference marked thereon, making a part of this specification.

The nature of my invention consists in the construction of a wheel-plow as an improvement upon the plow patented to me September 7, 1869, all as hereinafter more fully set forth.

In order to enable others skilled in the art to which my invention appertains to make and use the same, I will now proceed to describe its construction and operation, referring to the annexed drawings, in which—

Figure 1:
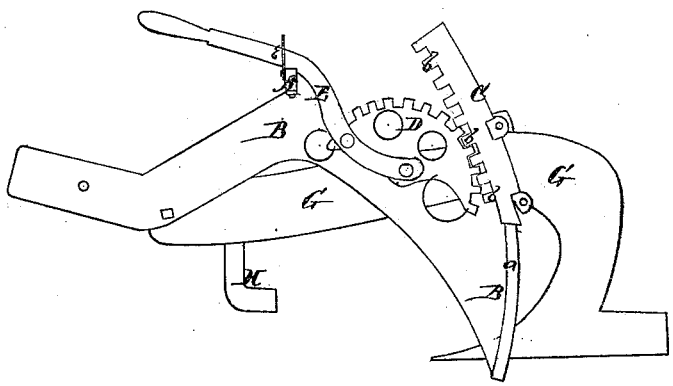
Figure 2:
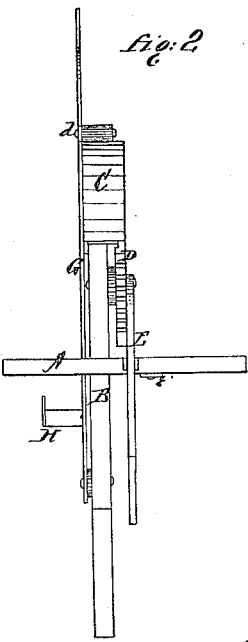

Figure 1 is a side elevation, and Fig. 2 is a plan view, of my plow, the wheels being removed.

A represents the axle of my plow, upon the ends of which the wheels should be placed.

In the center of the axle A is secured the iron frame B, of the peculiar construction shown in Fig. 1. Although I call it a "frame," it is in fact a solid bar, the front end of which forms the tongue. In front of the axle the frame B inclines downward and forward for a suitable distance, and is then bent straight forward. In rear of the axle the frame is curved, as shown, extending toward the rear and downward, with a flange, $a$, on one side, along its rear curved edge. This flange forms a guide for a grooved block, C, to slide up and down on the rear end of the frame B.

On one side, at the front edge of the block C, are cogs $b\ b$, which gear with a cogged segment, D, pivoted on the side of the frame B, and provided with a lever, E, by means of which it is turned and the block raised or lowered at will. At the point where the front end of the frame B turns straight forward the front end of the plow-beam G is pivoted to said frame, and said plow-beam is passed through a loop, $d$, on the side of the block C, so that by raising or lowering said block, as above described, the plow is also raised or lowered. When the plow is raised up, the lever E will rest upon the axle and be held by a hook, $e$, so that the plow can be taken from one field to another, or in turning.

To the plow-beam G is attached a gage, H, which I propose making adjustable, so that it can be set in such a manner as to cut any width of furrow.

The gage or plate drops in the furrow and presses lightly against the land, so that the plow cannot cut any more furrow than it is desired to have it, even if the driver is careless.

Having thus fully described my invention, what I claim as new, and desire to secure by Letters Patent, is—

In combination with the plow-beam A, provided with its grooved block C, with cog-teeth $b\ b$, the crooked beam B, pivoted to the beam A at its front, having a cam and flange, $a$, at its rear, and with segment D and lever E, all constructed as shown and described.

In testimony that I claim the foregoing I have hereunto set my hand this 30th day of August, 1870.

ORNAN OSBORN.

Witnesses:
MARY J. OSBORN,
HENRY BUTTERFIELD.